T. J. CHARON.
POWER ATTACHMENT FOR AUTOMOBILES.
APPLICATION FILED SEPT. 20, 1921.
Patented Aug. 1, 1922.
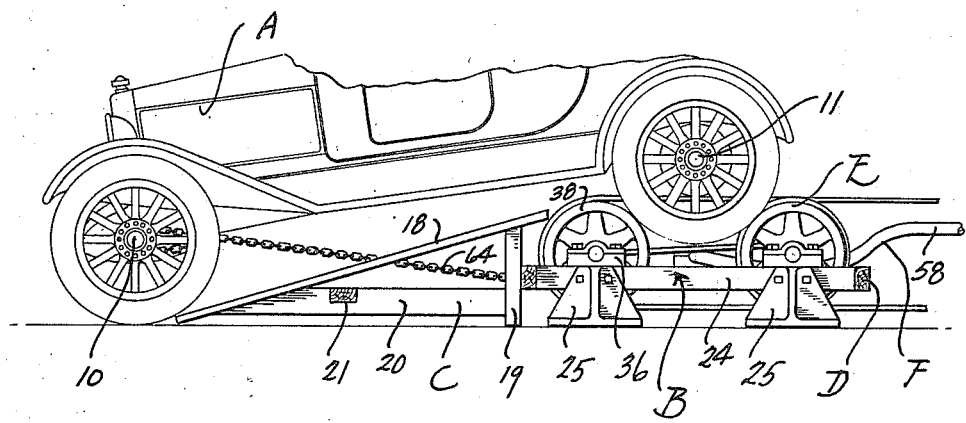
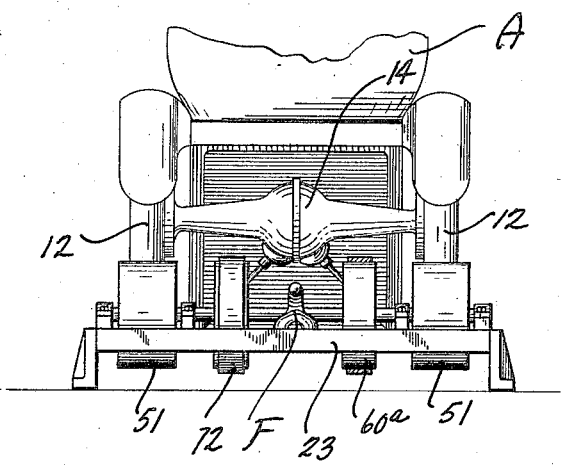
Inventor
Thomas J. Charon

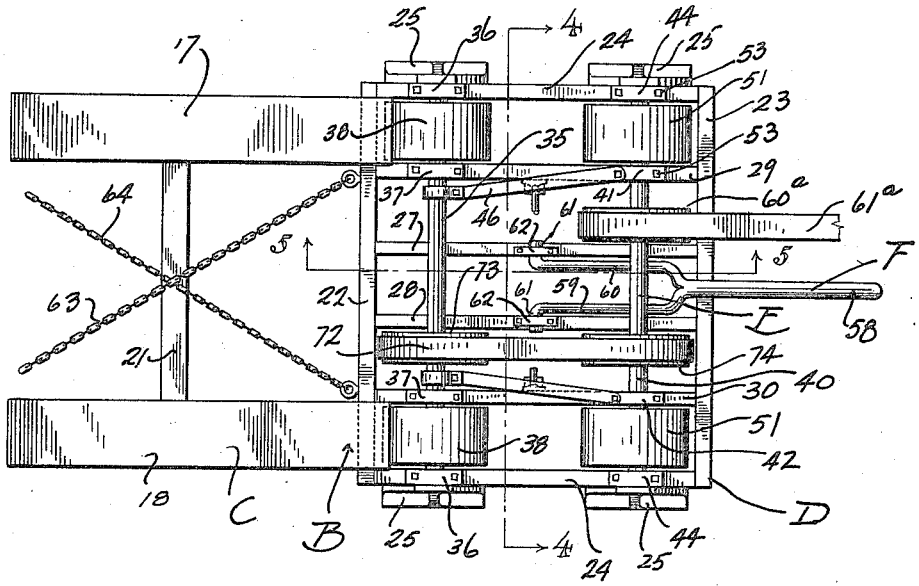
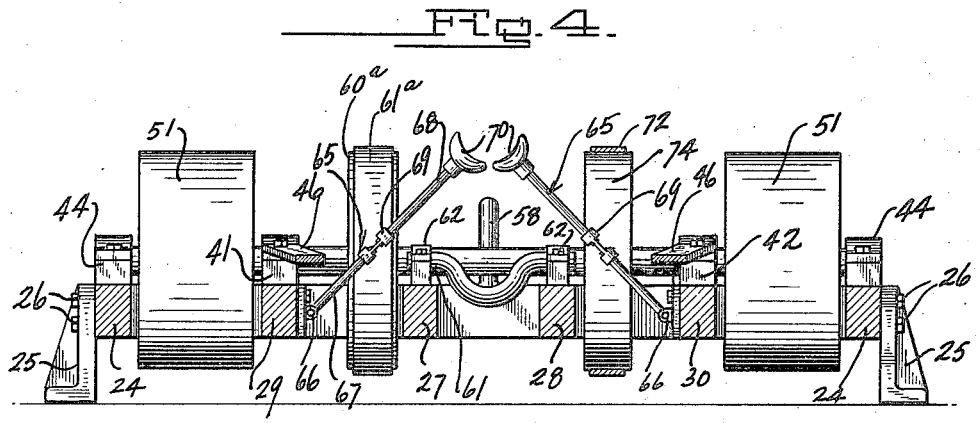

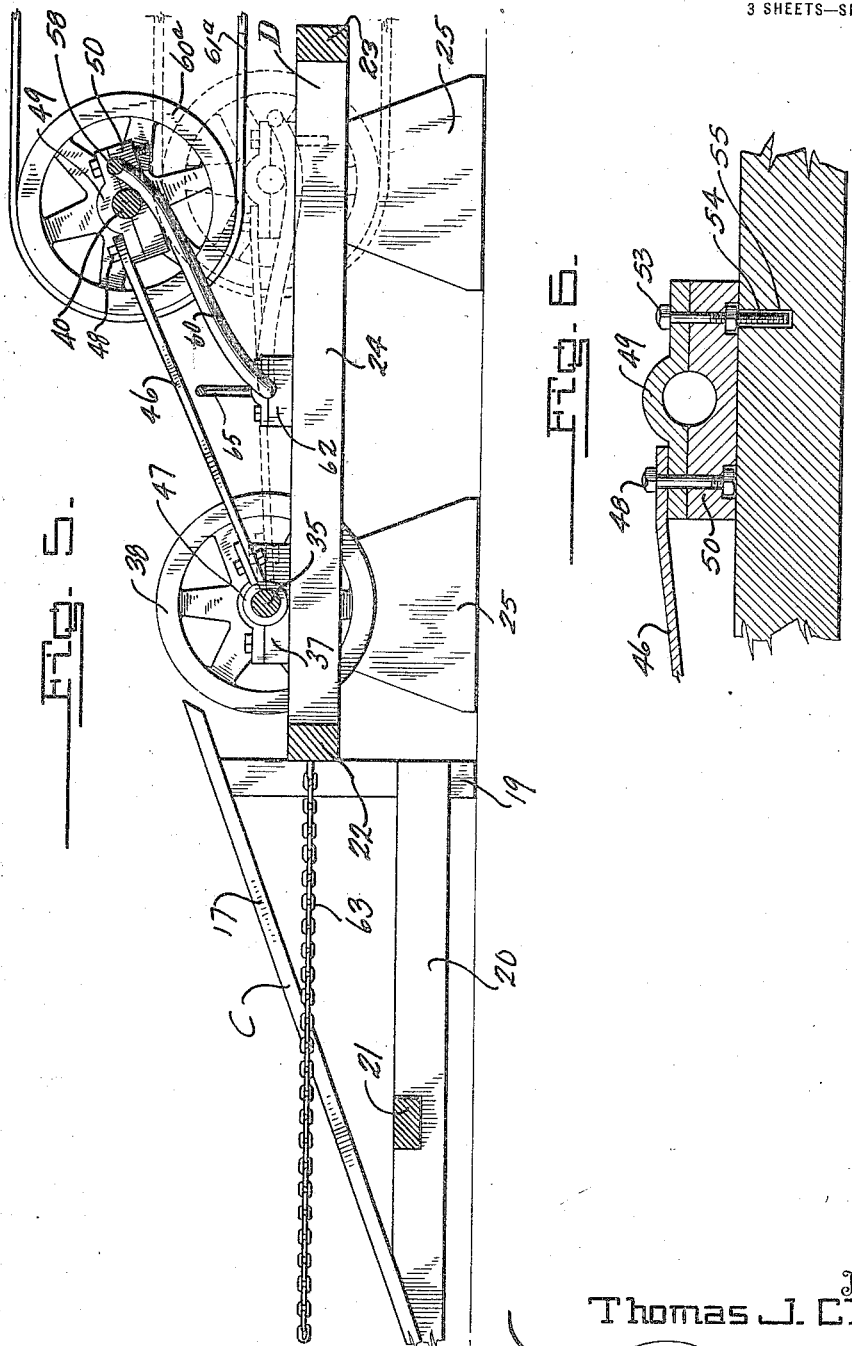

UNITED STATES PATENT OFFICE.

THOMAS J. CHARON, OF PARK RIVER, NORTH DAKOTA.

POWER ATTACHMENT FOR AUTOMOBILES.

1,424,281. Specification of Letters Patent. Patented Aug. 1, 1922.

Application filed September 20, 1921. Serial No. 501,992.

*To all whom it may concern:*

Be it known that I, THOMAS J. CHARON, a citizen of the United States, residing at Park River, in the county of Walsh and State of North Dakota, have invented certain new and useful Improvements in Power Attachments for Automobiles, of which the following is a specification.

This invention relates to a power attachment for use in connection with motor vehicles.

The primary object of the invention is the provision of a power mechanism for operation by the driven wheels of a motor vehicle, whereby power can be transmitted to various desired places in an effective and facile manner, for performing work.

A further object of the invention is the provision of a device of the above described character, including an improved means for mounting and dismounting of the motor driven wheels of a vehicle thereon.

Other objects and advantages will be apparent during the course of the following detailed description.

In the accompanying drawings forming a part of this specification, and in which similar reference characters designate corresponding parts throughout the several views.

Figure 1 is a side elevation of the improved power attachment showing the motor vehicle as used in connection therewith.

Figure 2 is a rear elevation of the improved power attachment, showing the motor vehicle in operative engagement therewith.

Figure 3 is a plan view of the improved power attachment.

Figure 4 is a cross sectional view taken on the line 4—4 of Figure 3.

Figure 5 is a cross sectional view, taken on the line 5—5 of Figure 3.

Figure 6 is an enlarged and fragmentary view showing the operative connection of several details of the power attachment.

In the drawings, wherein for the purpose of illustration is shown a preferred embodiment of my invention, the letter A designates a motor vehicle of any approved type, for use in connection with the power mechanism B. The power mechanism B preferably includes the runway structure C; supporting frame D; driven mechanism E; and means F to assist in displacement of the motor vehicle from the means E as desired.

The motor vehicle A may of course, be of any preferred construction, including the forward axle structure 10; and the rear axle structure 11; in which is included the driven vehicle wheels 12; and the enlarged differential casing 14.

The runway C comprises the tread boards 17 and 18, for receiving the wheels of a motor vehicle, said tread ways 17 and 18 each having a vertical support post 19 at the upper end thereof, which are connected by horizontal bracing planks 20 to the lower end of each of said treadways. A suitable cross brace or connecting member 21 may be used for spaced connection of the tread ways 17 and 18 to conform to the wheel gauge of the motor vehicle.

The frame D is substantially rectangular in formation, including a forward rail member 22; a rear rail member 23; and the side rails 24. Supporting standards 25 of any approved type, are provided as part of the frame means D for suspending the rails 22, 23, and 24, and may be connected in pairs as by bolts 26 to the outer surfaces of each of the side rails 24. A pair of intermediate bracing rails 27 and 28, in parallel alignment with the side rails 24, are provided centrally of the frame D in spaced relation and connected to the forward and rear members 22 and 23. A rail 29 is provided intermediate the centrally positioned rail 27 and its nearest side rail 24, and in parallel relation to said rail 27 and side rail 24. Similarly, a rail 30 is provided intermediate the other centrally positioned rail 28 and its nearest side rail 24, and in parallel relation to said rails. It is preferred, that all of the rails forming the frame D be in the same plane, to provide a simple and durable structure.

Referring now to the driven mechanism E, the same preferably includes a forward shaft 35, mounted parallel of the forward member 22 and adjacent the same, the bearing boxes 36 being provided upon the side rails 24, and the bearing boxes 37 being provided upon each of the members 29 and 30, for rotatably receiving the shaft 35. Wheels 38 are keyed or rigidly fixed to the shaft 35, and positioned in the spaces intermediate the supporting rails 29 and 30 and their respective side rails 24; and in such spaced relation that said wheels 38 will conform to the gauge of said vehicle wheels 12.

A second shaft 40 is provided for rotation with respect to the frame B, the same including a pair of journal boxes or bearings 41 and 42 for use upon the bracing rails 29 and 30 respectively. A pair of bearing boxes 44 are provided in connection with the shaft 40 and for detachable mounting upon the side rails 24. It is preferred that the shaft 40 be oscillatively mounted upon the frame D, and connected to the rotatable shaft 35 as a center. To this end, band metal straps 46 are looped at 47 upon one end for bearing upon the shaft 34, and extending to be connected to a bolt 48, which mounts the cap 49 to the base 50 of each of the bearing structures 41 and 42. Driven wheels 51 similar to the wheels 38 are provided for fixed mounting upon the shaft 40, and intermediate the space provided by the members 29 and 30 and their respective side rails 24, to conform to the gauge of the vehicle wheels 12. It can thus be seen that the entire shaft 40 is oscillatively mounted upon the frame B about the shaft 35 as a center; the bearing boxes 41, 42 and 44 cooperating in detachable manner upon the supporting frame D to effect such result. In order to prevent axial movement of the shaft 40, whereby the various bearing boxes of the same might slip off of the frame D, bolts 53 may be provided upon the various bearing boxes of the axle 40, which are much greater in length than the thickness of bearing boxes of said shaft 40, in order that an end 54 may project into a socket 55 of any of the rails 24, 27 or 28 upon which said bearing box is mounted.

The means F to facilitate removal of the motor vehicle A from the mechanism E is principally formed of the lever 58, which is bifurcated at one end to provide the spaced stems 59 and 60, having the outturned ends 61 for engagement with suitable bearing members 62 which are positioned upon the centrally spaced rails 27 and 28. The lever 58 has its pivotal mounting in the bearings 62 which are located intermediate the shafts 35 and 40 and extending rearwardly over the member 23, and beneath the shaft 40.

A pulley 60$^a$ is keyed onto the shaft 40, and provided with a belt 61$^a$ thereabout, which runs to any location for conveying power from the attachment B to perform work.

In mounting the vehicle A upon said improved power attachment B, said vehicle is backed onto the runway C in such manner that the driven wheels 12 thereof, may each engage a wheel 38 and 51 of the shafts 35 and 40, and in the manner illustrated in Figures 1 and 2 of the drawings. Thus the wheels 12 will rest in engagement with the driven mechanism E. Cables 63 and 64 are mounted upon the forward rail 22 of frame D, the same preferably being flexible chains and extend forwardly in cross manner to be attached in taut position in any approved manner over the forward axle structure 10.

In order to prevent the vehicle wheels 12 from slipping laterally off of the supporting wheels of the mechanism E, the side brace members 65 are provided, the same being hingedly connected at 66 to the inside surfaces of each of the rail members 29 and 30. Each brace member 65 includes the portion 67 which is hingedly connected as aforesaid at 66; and an adjustable portion 68, which is detachably mounted by a turn buckle structure 69 to a screw threaded end of the portion 67. End seats 70 are provided upon the extreme end of each of the sections 68 and are adapted for engaging against the axle housing 13. The adjustability of the arms 65 has been provided in order to lengthen or shorten the same in accordance with the type of vehicle used. The use of these brace arms 65 is obvious and in their ordinary position will be inclined inwardly from their supporting rails to be in engagement at their seating ends 70 with the differential casing 14 to prevent lateral sway of the vehicle A when the same is in operation. Suitable strap means (not shown) may be employed on the frame D, or may engage the brace arm 65, for securing the brace arms and frame D to the axle housing 13, in order to prevent too much vibration of the vehicle wheels 12 upon the mechanism E.

When the wheels 12 are positioned as above described, in engagement with the wheels 38 and 51 of the mechanism E and the motor of the vehicle A is operated to drive the wheels 12, said wheels 12 will drive the shafts 35 and 40 as is obvious.

In order to provide a uniform driving ratio between the shafts 35 and 40, a belt 72 is provided for driving connection over the pulleys 73 and 74 upon the shafts 35 and 40 respectively.

When it is desired to remove the vehicle A from the power attachment E the lever 58 is brought into play. The free end thereof may be manually raised or jacked up, in order that the rear shaft 40 may be oscillated in manner above described, thus raising the rear end of the vehicle A. When a sufficient tilt has been given the vehicle A, the wheels 12 thereof will ride easily over the forward wheels 38, with which they are in engagement, whereby the vehicle A may be run over the treadways 17 and 18, and after disconnection of the flexible cables 63 and 64.

Various changes in the shape, size and arrangement of parts, may be made to the form of the invention herein shown and described, without departing from the spirit of the invention or the scope of the claims.

I claim:

1. In a power attachment, the combination with a drive means, of a supporting frame, a shaft mounted for rotation on said frame, a second shaft mounted in detachable manner for rotation on said frame, means swingably connecting said second mentioned shaft to said first mentioned shaft, jack means on said frame engaging said second shaft for swinging the same on said first shaft, and means on said shafts for receiving a drive means.

2. In a device of the class described, the combination with a motor vehicle including an outstanding differential housing, of a supporting frame, driven means mounted upon said supporting frame, braces pivotally and adjustably connected to said supporting frame at opposite sides thereof adapted to incline toward each other in upwardly extending and converging relation to rest against the differential housing of said motor vehicle when the motor vehicle is upon said supporting frame for operably mounting said motor vehicle on said driven means against liability of lateral displacement.

3. In a device of the class described, the combination of a frame, a shaft, means hingedly connecting said shaft on said frame, said shaft being rotatable with respect to said means, and a lever oscillatively mounted in said frame for oscillating said shaft.

4. A power mechanism, comprising in combination a frame, a shaft mounted on said frame, vehicle driven means for said shafts, means oscillatively connecting one of said shafts to the other, and means on said frame for manual oscillation of said shaft.

5. In a device of the class described, the combination with a motor vehicle including driven wheels, an axle housing and differential casing, of a supporting frame, a pair of shafts rotatably placed in parallel alignment upon said frame, bars hingedly connecting one of said shafts to the other for oscillation thereabout, a runway for depositing said motor vehicle drive wheels upon the wheels of said shaft, means engaging said axle housing and differential casing for laterally mounting said motor vehicle, and jacking means to raise the vehicle wheels out of operating engagement with said shafts.

6. A power mechanism comprising a frame, a shaft, means rotatably connecting said shaft upon said frame in rigid manner, a second shaft, means rotatably mounting said second shaft upon said frame in detachable manner, means connecting said second mentioned shaft for oscillation of said second mentioned shaft about said first mentioned shaft as an axis, and an oscillating lever pivotally connected to said frame and adapted for engagement with said second mentioned shaft to oscillate the same.

THOMAS J. CHARON.